United States Patent
Kim et al.

(10) Patent No.: US 11,396,577 B2
(45) Date of Patent: Jul. 26, 2022

(54) POLYESTER FILM AND METHOD FOR REPRODUCING POLYESTER CONTAINER USING SAME

(71) Applicants: SKC CO., LTD., Gyeonggi-do (KR); SKC INC., Covington, GA (US)

(72) Inventors: Chul Kyu Kim, Gyeonggi-do (KR); Yong Deuk Kim, Gyeonggi-do (KR); Joo Ho Yang, Gyeonggi-do (KR); Eugene Jung, Lawrenceville, GA (US); Hyuk Soo Lee, Gyeonggi-do (KR)

(73) Assignees: SKC CO., LTD., Gyeonggi-do (KR); SKC INC., Covington, GA (US)

( * ) Notice: Subject to any disclaimer, the term of this patent is extended or adjusted under 35 U.S.C. 154(b) by 0 days.

(21) Appl. No.: 17/285,787

(22) PCT Filed: Oct. 22, 2020

(86) PCT No.: PCT/KR2020/014535
§ 371 (c)(1),
(2) Date: Apr. 15, 2021

(87) PCT Pub. No.: WO2021/085938
PCT Pub. Date: May 6, 2021

(65) Prior Publication Data
US 2022/0098377 A1    Mar. 31, 2022

Related U.S. Application Data

(60) Provisional application No. 62/928,913, filed on Oct. 31, 2019.

(30) Foreign Application Priority Data

Sep. 16, 2020 (KR) .......... 10-2020-0118929
Sep. 16, 2020 (KR) .......... 10-2020-0118930

(51) Int. Cl.
| | |
|---|---|
| C08J 5/18 | (2006.01) |
| C08G 63/183 | (2006.01) |
| B29C 48/08 | (2019.01) |
| B29C 48/00 | (2019.01) |
| B29B 17/04 | (2006.01) |
| C08J 7/04 | (2020.01) |
| C08G 63/181 | (2006.01) |

(52) U.S. Cl.
CPC .......... *C08G 63/183* (2013.01); *B29B 17/04* (2013.01); *B29B 17/0412* (2013.01); *B29C 48/0018* (2019.02); *B29C 48/08* (2019.02); *C08G 63/181* (2013.01); *C08J 5/18* (2013.01); *C08J 7/0427* (2020.01); *B29B 2017/0436* (2013.01); *B29B 2017/0468* (2013.01); *C08J 2367/02* (2013.01); *C08J 2467/02* (2013.01)

(58) Field of Classification Search
USPC ..... 428/411.1, 412, 34.1, 34.9, 35.7; 521/48
See application file for complete search history.

(56) References Cited

U.S. PATENT DOCUMENTS

| | | |
|---|---|---|
| 2014/0069587 A1 | 3/2014 | Rackovan et al. |
| 2017/0213484 A1 | 7/2017 | Schottland et al. |

FOREIGN PATENT DOCUMENTS

| | | |
|---|---|---|
| EP | 0924678 A2 | 6/1999 |
| JP | 2001-058622 A | 3/2001 |
| JP | 2003-122256 A | 4/2003 |
| JP | 2014-065282 A | 4/2014 |
| KR | 10-2007-0007058 A | 1/2007 |
| KR | 10-0981129 B1 | 9/2010 |

OTHER PUBLICATIONS

JP2001058622A Machine Translation Hiroshi Shibano et al.,Packaging reuse or recycling, e.g. of multilayer packaging (Year: 2019).*
Extended European Search Report issued by the European Patent Office dated Feb. 11, 2022.

* cited by examiner

*Primary Examiner* — Terressa Boykin
(74) *Attorney, Agent, or Firm* — IP & T Group LLP

(57) ABSTRACT

Embodiments relate to a polyester-based film and a process for regenerating a polyester-based container using the same, which not only solve the environmental problems by enhancing the recyclability of polyester-based containers but also are capable of enhancing the quality, yield, and productivity. When the polyester-based film is cut into a size of 1 cm in width and 1 cm in length, immersed in an aqueous solution of sodium hydroxide (NaOH) having a concentration of 1% by weight, and stirred for 15 minutes at 85° C. at a speed of 240 m/minute, the average particle size of the component of the printing layer separated from the base layer satisfies 15 μm or more. Thus, it is possible to enhance the quality of the regenerated polyester-based chips produced from the polyester-based container provided with the polyester-based film.

10 Claims, No Drawings

POLYESTER FILM AND METHOD FOR REPRODUCING POLYESTER CONTAINER USING SAME

This application is a national stage application of PCT/KR2020/014535 filed on Oct. 22, 2020, which claims priorities of U.S. provisional application No. 62/928,913 filed on Oct. 31, 2019, Korean patent application number 10-2020-0118929 filed on Sep. 16, 2020 and Korean patent application number 10-2020-0118930 filed on Sep. 16, 2020. The disclosure of each of the foregoing applications is incorporated herein by reference in its entirety.

TECHNICAL FIELD

Embodiments relate to a polyester-based film and a process for regenerating a polyester-based container using the same, which not only solve the environmental problems by enhancing the recyclability of polyester-based containers but also are capable of enhancing the quality, yield, and productivity.

BACKGROUND ART

As concerns about environmental problems have increased in recent years, there is a demand for addressing the recycling issues of products fabricated using thermoplastic polymers. In particular, polyethylene terephthalate, a thermoplastic resin having excellent properties in terms of thermal resistivity, processability, transparency, and non-toxicity, has been widely used for producing a wide range of products such as films, fibers, bottles, containers, and the like, and efforts have been continued to enhance the regeneration rate thereof.

In general, a stretched film of polyolefin or the like is attached as a label to a container produced from PET. Thus, once a PET container recycled from the consumers has been washed and crushed, it is then subjected to liquid specific gravity separation, dehydration, drying, and/or wind specific gravity separation in order to remove a large amount of films contained in the crushed product and then to such an additional step as pelletization to obtain regenerated polyester-based chips. However, there has been a disadvantage in that the films are not completely removed even after the above steps, in particular, the regenerated polyester-based chips are colored due to the inks contained in the film, or the regenerated polyester-based chips are non-uniformly clumped due to the thermal characteristics of the film during the thermal treatment thereof.

Accordingly, a method of using a film made of a low specific gravity polymer such as polystyrene, polyethylene, polypropylene, and the like as a label has been proposed in order to readily carry out the specific gravity separation. However, the low specific gravity thereof cannot be effectively achieved due to the ink layer, which makes it difficult to completely separate and remove the films, and the problem that the residual ink colors the regenerated polyester-based chips cannot be solved.

DISCLOSURE OF INVENTION

Technical Problem

Accordingly, the embodiments aim to provide a polyester-based film and a process for regenerating a polyester-based container using the same, which are capable of preventing environmental pollution and enhancing the recyclability and quality in the regeneration process of containers.

Solution to Problem

The polyester-based film according to an embodiment comprises a base layer comprising a polyester-based resin; and a printing layer disposed on one side of the base layer, wherein when the film is cut into a size of 1 cm in width and 1 cm in length, immersed in an aqueous solution of sodium hydroxide (NaOH) having a concentration of 1%, and stirred for 15 minutes at 85° C. at a speed of 240 m/minute, the average particle size of the component of the printing layer separated from the base layer is 15 µm or more.

The polyester-based film according to another embodiment comprises a base layer comprising a polyester-based resin; a printing layer opposite to the base layer; and a stripping promoting layer interposed between the base layer and the printing layer, wherein when the film is cut into a size of 1 cm in width and 1 cm in length, immersed in an aqueous solution of sodium hydroxide (NaOH) having a concentration of 1%, and stirred for 15 minutes at 85° C. at a speed of 240 m/minute, the average particle size of the component of the printing layer separated from the base layer is 15 µm or more.

The process for regenerating a polyester-based container according to still another embodiment comprises providing a polyester-based container at least a portion of which is surrounded by the polyester-based film; crushing the polyester-based container provided with the film to obtain flakes; immersing the crushed flakes in an aqueous solution of sodium hydroxide (NaOH) having a concentration of 1% at 85° C., and thermally treating the immersed flakes to produce regenerated polyester-based chips, wherein when the flakes are thermally treated at a temperature of 200° C. to 220° C. for 60 minutes to 120 minutes, the clumping fraction is 5% or less.

The regenerated polyester-based chips according to still another embodiment are produced by the process for regenerating a polyester-based container.

Advantageous Effects of the Invention

When the polyester-based film according to the embodiment is immersed in an aqueous solution of sodium hydroxide under the specific conditions of temperature, concentration, and stirring speed, the printing layer thereof is not entirely dissolved in the aqueous solution of sodium hydroxide, while the average particle size of the component of the printing layer separated from the base layer is adjusted to a specific range. Thus, the component of the printing layer can be readily separated in the regeneration process of a polyester-based container comprising the film, thereby preventing environmental pollution.

In addition, the polyester-based film according to the embodiment enhances the recyclability of a polyester-based container comprising the film, thereby enhancing the quality, yield, and productivity of the regenerated polyester-based chips produced by the process for regenerating the polyester-based container using the film.

Further, the process for regenerating a polyester-based container according to the embodiment does not require a separate step of separating the polyester-based container and the film. Thus, it is economical since time and cost are saved.

BEST MODE FOR CARRYING OUT THE INVENTION

Hereinafter, the present invention will be described in detail with reference to embodiments. The embodiments are not limited to those described below. Rather, they can be modified into various forms as long as the gist of the invention is not altered.

Throughout the present specification, when a part is referred to as "comprising" an element, it is understood that other elements may be comprised, rather than other elements are excluded, unless specifically stated otherwise.

All numbers and expressions related to the quantities of components, reaction conditions, and the like used herein are to be understood as being modified by the term "about," unless otherwise indicated.

Throughout the present specification, the terms first, second, and the like are used to describe various components. But the components should not be limited by the terms. The terms are used only for the purpose of distinguishing one component from another.

In the regeneration process of a container provided with a film as a label, it is important to effectively separate and remove the component of the printing layer, particularly ink, for enhancing the recyclability and quality of the container. A washing step with an aqueous solution of sodium hydroxide may be carried out as a method of removing the component of the printing layer. In the washing step, the component of the printing layer is almost dissolved in the aqueous solution of sodium hydroxide, or the average particle size thereof becomes very small, making its separation difficult.

Specifically, if the component of the printing layer is almost dissolved in an aqueous solution of sodium hydroxide in the washing step, it is difficult to separate the component of the printing layer dissolved in the aqueous solution of sodium hydroxide, which may contaminate the environment.

In addition, if the average particle size of the component of the printing layer is very small, e.g., less than 15 μm, the recyclability and quality of the container may be deteriorated, and additional costs may be incurred during the separation step from the aqueous solution of sodium hydroxide.

When the polyester-based film according to an embodiment is cut into a size of 1 cm in width and 1 cm in length, immersed in an aqueous solution of sodium hydroxide (NaOH) having a concentration of 1%, and stirred for 15 minutes at 85° C. at a speed of 240 m/minute, the average particle size of the component of the printing layer separated from the base layer is adjusted to 15 μm or more.

Accordingly, in the regeneration process of a container provided with the film, the component of the printing layer is not dissolved in an aqueous solution of sodium hydroxide, and the component of the printing layer can be effectively separated, so that the recyclability and quality of the container can be enhanced, while environmental pollution is effectively prevented.

Polyester-Based Film

The polyester-based film according to an embodiment comprises a base layer comprising a polyester-based resin; and a printing layer disposed on one side of the base layer, wherein when the film is cut into a size of 1 cm in width and 1 cm in length, immersed in an aqueous solution of sodium hydroxide (NaOH) having a concentration of 1%, and stirred for 15 minutes at 85° C. at a speed of 240 m/minute, the average particle size of the component of the printing layer separated from the base layer is 15 μm or more.

The polyester-based film according to another embodiment comprises a base layer comprising a polyester-based resin; a printing layer opposite to the base layer; and a stripping promoting layer interposed between the base layer and the printing layer, wherein when the film is cut into a size of 1 cm in width and 1 cm in length, immersed in an aqueous solution of sodium hydroxide (NaOH) having a concentration of 1%, and stirred for 15 minutes at 85° C. at a speed of 240 m/minute, the average particle size of the component of the printing layer separated from the base layer is 15 μm or more.

Base Layer

The polyester-based resin comprises a diol component and a dicarboxylic acid component.

Specifically, the diol component may comprise at least one selected from the group consisting of ethylene glycol, diethylene glycol, propanediol unsubstituted or substituted with an alkyl group, butanediol unsubstituted or substituted with an alkyl group, pentanediol unsubstituted or substituted with an alkyl group, hexanediol unsubstituted or substituted with an alkyl group, octanediol unsubstituted or substituted with an alkyl group, and a combination thereof.

For example, the diol component may comprise at least one selected from the group consisting of ethylene glycol, diethylene glycol, 1,3-propanediol, 1,2-octanediol, 1,3-octanediol, 2,3-butanediol, 1,3-butanediol, 1,4-butanediol, 1,5-pentanediol, neopentyl glycol, 2-butyl-2-ethyl-1,3-propanediol, 2,2-diethyl-1,5-pentanediol, 2,4-diethyl-1,5-pentanediol, 3-methyl-1,5-pentanediol, and 1,1-dimethyl-1,5-pentanediol.

More specifically, the diol component may comprise at least one selected from the group consisting of ethylene glycol, diethylene glycol, and neopentyl glycol.

The polyester-based resin may comprise neopentyl glycol in an amount of 1 to 35% by mole based on the total number of moles of the diol component. For example, the polyester-based resin may comprise neopentyl glycol in an amount of 3% by mole to 35% by mole, 5% by mole to 35% by mole, 7% by mole to 35% by mole, 7% by mole to 33% by mole, 10% by mole to 33% by mole, 15% by mole to 33% by mole, 17% by mole to 30% by mole, 20% by mole to 35% by mole, 20% by mole to 33% by mole, 21% by mole to 33% by mole, or 22% by mole to 30% by mole, based on the total number of moles of the diol component.

Since the content of neopentyl glycol satisfies the above range, the heat shrinkage rate in a first direction or in a second direction perpendicular to the first direction is readily adjusted when the film is thermally shrunk, so that it is possible to prevent wrinkles or deformation when the film is applied to a container.

In the present specification, the first direction may be the transverse direction (TD) or the longitudinal direction (MD), and the second direction perpendicular to the first direction may be the longitudinal direction (MD) or the transverse direction (TD). For example, the first direction may be the longitudinal direction (MD), and the second direction may be the transverse direction (TD) as the main shrinkage direction.

The polyester-based resin may comprise ethylene glycol in an amount of 55% by mole to 90% by mole and diethylene glycol in an amount of 1% by mole to 15% by mole, based on the total number of moles of the diol component. For example, the polyester-based resin may comprise ethylene glycol in an amount of 60% by mole to 90% by mole, 55% by mole to 85% by mole, 58% by mole to 80% by mole, 60% by mole to 78% by mole, 63% by mole to 78% by mole, 63% by mole to 75% by mole, or 65% by mole to 73% by mole and diethylene glycol in an amount of 1% by mole to 13% by mole, 1% by mole to 10% by mole, 3% by mole to 15% by mole, 3% by mole to 13% by mole, 4% by mole to 10% by mole, 4% by mole to 8% by mole, 5% by mole to 7% by mole, 1% by mole to 7% by mole, 2% by mole to 6% by mole, 3% by mole to 5.5% by mole, 3.5% by mole to 5.5% by mole, or 4% by mole to 5.5% by mole, based on the total number of moles of the diol component.

In addition, the molar ratio of ethylene glycol and diethylene glycol may be 5 to 60:1. For example, the molar ratio of ethylene glycol and diethylene glycol may be 7 to 55:1, 10 to 50:1, 13 to 46:1, 12 to 15:1, 13 to 14.7:1, 7.8 to 26:1, 7.8 to 23:1, 7.8 to 20:1, 8 to 18:1, 8 to 16:1, or 9 to 16:1. Since the molar ratio of ethylene glycol and diethylene glycol satisfies the above range, there is an advantageous effect on shrinkage uniformity and shrinkage stress, so that the component of the printing layer can be more readily removed in the subsequent regeneration process.

In addition, the polyester-based resin may further comprise a monohydric alcohol in addition to the diol component. For example, the monohydric alcohol may be methanol, ethanol, isopropyl alcohol, allyl alcohol, or benzyl alcohol. Specifically, the polyester-based resin may comprise a monohydric alcohol in an amount of 10 to 30% by mole, 13 to 25% by mole, or 15 to 22% by mole, based on the total number of moles of the diol component and the monohydric alcohol, but it is not limited thereto.

The dicarboxylic acid component may be selected from the group consisting of an aromatic dicarboxylic acid such as terephthalic acid, dimethylterephthalic acid, isophthalic acid, naphthalene dicarboxylic acid, and the like; an aliphatic dicarboxylic acid such as adipic acid, azelaic acid, sebacic acid, decanedicarboxylic acid, and the like; an alicyclic dicarboxylic acid; an ester thereof; and a combination thereof.

Specifically, the dicarboxylic acid component may comprise an aromatic dicarboxylic acid. For example, the dicarboxylic acid component may comprise terephthalic acid or dimethyl terephthalic acid in an amount of 80% by mole or more, 90% by mole or more, 95% by mole or more, or 99% by mole or more, based on the total number of moles of the dicarboxylic acid component.

The diol component and the dicarboxylic acid component are subjected to a transesterification reaction and then polymerization to thereby form a polyester-based resin.

Specifically, at least one catalyst selected from manganese acetate, calcium acetate, and zinc acetate may be used as a catalyst for the transesterification reaction. The content of the catalyst may be 0.02% by weight to 0.2% by weight, 0.02% by weight to 0.1% by weight, or 0.03% by weight to 0.08% by weight, based on the total weight of the dicarboxylic acid compound.

In addition, upon completion of the transesterification reaction, at least one additive selected from the group consisting of silica, potassium, and magnesium; a stabilizer such as trimethyl phosphate; a polymerization catalyst such as antimony trioxide and tetrabutylene titanate; and the like may be selectively added.

In addition, the thickness of the base layer may be 10 μm to 100 μm. For example, the thickness of the base layer may be 20 μm to 80 μm, 30 μm to 70 μm, 35 μm to 65 μm, 35 μm to 55 μm, 40 μm to 60 μm, or 35 μm to 45 μm. Since the thickness of the base layer satisfies the above range, it is possible to effectively prevent a deterioration in the physical properties of the film and the deformation of appearance such as curls or wrinkles when a printing layer is formed on one side of the base layer.

The haze of the base layer may be 10% or less. For example, it may be 9% or less, 8.5% or less, 8% or less, 7% or less, 6.5% or less, and it may be 3% to 10%, 4% to 9%, 4.5% to 8%, 4.5% to 7%, or 4.8% to 6.5%.

Since the haze of the base layer satisfies the above range, it is convenient to use the film comprising the base layer as a label. Specifically, if the haze is too low, the transparency may be too high to be suitable for use as a label on a container.

Printing Layer

The polyester-based film according to an embodiment comprises a printing layer on one side of the base layer.

Specifically, the printing layer may be formed from a composition for a printing layer that comprises a first solvent, a first binder, and a first pigment.

The first solvent may comprise one or more selected from the group consisting of benzene, xylene, toluene, tetramethylbenzene, acetone, methyl ethyl ketone, methyl isobutyl ketone, cyclohexanone, methanol, ethanol, propanol, isopropyl alcohol, butyl alcohol, 2-methyl-2-propanol, octanol, allyl alcohol, benzyl alcohol, ethylene glycol, diethylene glycol, triethylene glycol, tetramethylene glycol, tetraethylene glycol, propylene glycol, dipropylene glycol, tripropylene glycol, hexylene glycol, and neopentyl glycol. Specifically, it may preferably be one or more selected from the group consisting of methanol, ethanol, propanol, isopropyl alcohol, butyl alcohol, 2-methyl-2-propanol, octanol, allyl alcohol, benzyl alcohol, ethylene glycol, diethylene glycol, triethylene glycol, tetramethylene glycol, tetraethylene glycol, propylene glycol, dipropylene glycol, tripropylene glycol, hexylene glycol, and neopentyl glycol.

In addition, the composition for a printing layer may comprise the first solvent in an amount of 1% by weight to 35% by weight based on the total weight of the composition for a printing layer. For example, the content of the first solvent may be 3% by weight to 35% by weight, 5% by weight to 35% by weight, 10% by weight to 33% by weight, 15% by weight to 32% by weight, 18% by weight to 32% by weight, 25% by weight to 32% by weight, 28% by weight to 32% by weight, 20% by weight to 35% by weight, or 20% by weight to 30% by weight, based on the total weight of the composition for a printing layer. Since the content of the first solvent satisfies the above range, when the film is cut into a size of 1 cm in width and 1 cm in length, immersed in an aqueous solution of sodium hydroxide (NaOH) having a concentration of 1%, and stirred for 15 minutes at 85° C. at a speed of 240 m/minute, the average particle size of the component of the printing layer separated from the base layer can be adjusted to 15 μm or more.

The first binder may comprise at least one selected from the group consisting of a polyester-based resin, an acrylic-based resin, a urethane-based resin, a nitrocellulose-based resin, a chlorinated polypropylene-based resin, and a polyester urethane-based resin.

In addition, the composition for a printing layer may comprise the first binder in an amount of 25% by weight to 60% by weight based on the total weight of the composition for a printing layer. For example, the content of the first binder may be 27% by weight to 60% by weight, 25% by weight to 55% by weight, 25% by weight to 50% by weight, 28% by weight to 45% by weight, 28% by weight to 42% by weight, or 30% by weight to 40% by weight % by weight, based on the total weight of the composition for a printing layer. Since the content of the first binder satisfies the above range, when the film is cut into a size of 1 cm in width and 1 cm in length, immersed in an aqueous solution of sodium hydroxide (NaOH) having a concentration of 1%, and stirred for 15 minutes at 85° C. at a speed of 240 m/minute, the average particle size of the component of the printing layer separated from the base layer can be adjusted to 15 μm or more.

The weight ratio of the first solvent and the first binder may be 1:0.5 to 2.5. For example, the weight ratio of the first solvent and the first binder may be 1:0.7 to 2.3, 1:0.9 to 2.2, 1:0.9 to 2.1, 1:0.7 to 1.5, 1:0.7 to 1.3, or 1:0.9 to 1.2. Since the weight ratio of the first solvent and the first binder satisfies the above range, when the film is cut into a size of 1 cm in width and 1 cm in length, immersed in an aqueous solution of sodium hydroxide (NaOH) having a concentration of 1%, and stirred for 15 minutes at 85° C. at a speed of 240 m/minute, the printing layer can be more effectively separated from the base layer while the average particle size of the component of the printing layer separated from the base layer can be adjusted to 15 μm or more.

The first pigment may be an insoluble azo-based such as barium sulfate, calcium carbonate, titanium oxide, yellow iron oxide, black iron, chromium yellow, chromium chrome vermilion, cadmium yellow, cadmium red, royal blue, ultramarine, and organic pigments; soluble azo-based; phthalocyanine-based; quinacridone-based; polyazo-based, or a mixture thereof. Specifically, the first pigment may be one or more selected from the group consisting of carbon black, titanium oxide, insoluble azo-based, phthalocyanine-based, and polyazo-based.

In addition, the composition for a printing layer may comprise the first pigment in an amount of 5% by weight to 50% by weight based on the total weight of the composition for a printing layer. For example, the content of the first pigment may be 10% by weight to 50% by weight, 20% by weight to 45% by weight, 25% by weight to 45% by weight, 30% by weight to 45% by weight, or 35% by weight to 45% by weight, based on the total weight of the composition for a printing layer.

The printing layer may have a thickness of 0.1 μm to 100 μm. For example, the thickness of the printing layer may be 0.1 μm to 80 μm, 0.3 μm to 60 μm, 0.5 μm to 40 μm, 0.5 μm to 30 μm, 0.7 μm to 20 μm, 1 μm to 15 μm, 1.5 μm to 10 μm, 1.5 μm to 7 μm, 1.5 μm to 5 μm, or 1.5 μm to 3 μm. Since the thickness of the printing layer satisfies the above range, the resistance to scratch can be enhanced without deteriorating the color development of the printing layer.

The polyester-based film according to another embodiment comprises a printing layer at a position opposite to the base layer. Specifically, the polyester-based film according to another embodiment comprises a stripping promoting layer, and the printing layer may be formed on one side of the stripping promoting layer, wherein the printing layer, the stripping promoting layer, and the base layer may be positioned in order.

The printing layer formed on one side of the stripping promoting layer may be formed from the composition for a printing layer that comprises a first solvent, a first binder, and a first pigment.

The first solvent of the printing layer formed on one side of the stripping promoting layer may be one or more selected from the group consisting of benzene, xylene, toluene, tetramethylbenzene, acetone, methyl ethyl ketone, methyl isobutyl ketone, cyclohexanone, methanol, ethanol, propanol, isopropyl alcohol, butyl alcohol, 2-methyl-2-propanol, octanol, allyl alcohol, benzyl alcohol, ethylene glycol, diethylene glycol, triethylene glycol, tetramethylene glycol, tetraethylene glycol, propylene glycol, dipropylene glycol, tripropylene glycol, hexylene glycol, and neopentyl glycol.

Specifically, in the case of benzene, xylene, toluene, tetramethylbenzene, acetone, methyl ethyl ketone, methyl isobutyl ketone, or cyclohexanone used in the conventional printing layer, it is almost dissolved in an aqueous solution of sodium hydroxide during the washing step using the aqueous solution of sodium hydroxide, or the average particle size is very small, making its separation difficult.

However, in the case of a polyester film comprising a stripping promoting layer according to an embodiment, even if the printing layer comprises benzene, xylene, toluene, tetramethylbenzene, acetone, methyl ethyl ketone, methyl isobutyl ketone, or cyclohexanone, the component of the printing layer can be effectively separated while the component of the printing layer is not dissolved in an aqueous solution of sodium hydroxide.

Stripping Promoting Layer

The film according to another embodiment comprises a stripping promoting layer on one side of the base layer. Specifically, the film comprises a stripping promoting layer interposed between the base layer and the printing layer.

If the film comprises a stripping promoting layer interposed between the base layer and the printing layer, when the film is cut into a size of 1 cm in width and 1 cm in length, immersed in an aqueous solution of sodium hydroxide (NaOH) having a concentration of 1%, and stirred for 15 minutes at 85° C. at a speed of 240 m/minute, the average particle size of the component of the printing layer separated from the base layer can be adjusted to 15 μm or more. In addition, the separation of the component of the printing layer can be more readily performed.

The stripping promoting layer may be formed from a composition for a stripping promoting layer that comprises a second solvent and a second binder.

The second solvent may comprise one or more selected from the group consisting of methanol, ethanol, propanol, isopropyl alcohol, butyl alcohol, 2-methyl-2-propanol, octanol, allyl alcohol, benzyl alcohol, ethylene glycol, diethylene glycol, triethylene glycol, tetramethylene glycol, tetraethylene glycol, propylene glycol, dipropylene glycol, tripropylene glycol, hexylene glycol, and neopentyl glycol.

In addition, the composition for a stripping promoting layer may comprise the second solvent in an amount of 15% by weight to 40% by weight based on the total weight of the composition for a stripping promoting layer. For example, the content of the second solvent may be 17% by weight to 40% by weight, 15% by weight to 38% by weight, 17% by weight to 38% by weight, or 20% by weight to 35% by weight, based on the total weight of the composition for a stripping promoting layer. Since the content of the second solvent satisfies the above range, when the film is cut into a size of 1 cm in width and 1 cm in length, immersed in an aqueous solution of sodium hydroxide (NaOH) having a concentration of 1%, and stirred for 15 minutes at 85° C. at a speed of 240 m/minute, the component of the printing layer can be more readily separated from the base layer, and the average particle size of the component of the printing layer separated from the base layer can be adjusted to 15 μm or more.

The second binder may comprise at least one selected from the group consisting of a polyester-based resin, an acrylic-based resin, a polyurethane-based resin, an acrylic urethane-based resin, a nitrocellulose-based resin, a chlorinated polypropylene-based resin, and a polyester urethane-based resin.

In addition, the composition for a stripping promoting layer may comprise the second binder in an amount of 10% by weight to 55% by weight based on the total weight of the composition for a stripping promoting layer. For example, the content of the second binder may be 15% by weight to 50% by weight, 15% by weight to 45% by weight, 20% by weight to 43% by weight, or 25% by weight to 40% by weight, based on the total weight of the composition for a stripping promoting layer. Since the content of the second binder satisfies the above range, when the film is cut into a size of 1 cm in width and 1 cm in length, immersed in an aqueous solution of sodium hydroxide (NaOH) having a concentration of 1%, and stirred for 15 minutes at 85° C. at a speed of 240 m/minute, the component of the printing layer can be more readily separated from the base layer, and the average particle size of the component of the printing layer separated from the base layer can be adjusted to 15 μm or more.

The weight ratio of the second solvent and the second binder may be 1:0.5 to 3. For example, the weight ratio of the second solvent and the second binder may be 1:0.5 to 2.7, 1:0.5 to 2.5, 1:0.6 to 2.3, or 1:0.7 to 2. Since the weight ratio of the second solvent and the second binder satisfies the above range, when the film is cut into a size of 1 cm in width and 1 cm in length, immersed in an aqueous solution of sodium hydroxide (NaOH) having a concentration of 1%, and stirred for 15 minutes at 85° C. at a speed of 240 m/minute, the component of the printing layer can be more readily separated from the base layer, and the average particle size of the component of the printing layer separated from the base layer can be adjusted to 15 μm or more.

In addition, the composition for a stripping promoting layer may further comprise a second pigment. Specifically, the second pigment may be an insoluble azo-based such as barium sulfate, calcium carbonate, titanium oxide, yellow iron oxide, black iron, chromium yellow, chrome vermilion, cadmium yellow, cadmium red, royal blue, ultramarine, and organic pigments; soluble azo-based; phthalocyanine-based; quinacridone-based; polyazo-based, or a mixture thereof. Specifically, the second pigment may be one or more selected from the group consisting of carbon black, titanium oxide, insoluble azo-based, phthalocyanine-based, and polyazo-based.

The composition for a stripping promoting layer may comprise the second pigment in an amount of 5% by weight to 50% by weight based on the total weight of the composition for a stripping promoting layer. For example, the content of the second pigment may be 3% by weight to 50% by weight, 5% by weight to 50% by weight, 10% by weight to 50% by weight, 20% by weight to 45% by weight, 25% by weight to 45% by weight, 30% by weight to 45% by weight, or 35% by weight to 45% by weight, based on the total weight of the composition for a stripping promoting layer.

The stripping promoting layer may have a thickness of 10 μm to 200 μm. For example, the thickness of the stripping promoting layer may be 15 nm to 180 nm, 20 nm to 150 nm, 40 nm to 120 nm, 60 nm to 110 nm, 80 nm to 110 nm, 20 nm to 80 nm, 30 nm to 60 nm, or 40 nm to 50 nm. Since the thickness of the stripping promoting layer satisfies the above range, when the film is cut into a size of 1 cm in width and 1 cm in length, immersed in an aqueous solution of sodium hydroxide (NaOH) having a concentration of 1%, and stirred for 15 minutes at 85° C. at a speed of 240 m/minute, the component of the printing layer can be more readily separated from the base layer.

When the film is cut into a size of 1 cm in width and 1 cm in length, immersed in an aqueous solution of sodium hydroxide (NaOH) having a concentration of 1%, and stirred for 15 minutes at 85° C. at a speed of 240 m/minute, the average particle size of the component of the printing layer separated from the base layer may be 15 μm or more. For example, the average particle size of the component of the printing layer separated from the base layer may be 20 μm or more, 23 μm or more, 25 μm or more, and it may be 15 μm to 1,000 μm, 15 μm to 100 μm, 15 μm to 80 μm, 20 μm to 100 μm, 20 μm to 80 μm, 25 μm to 75 μm, 20 μm to 1,000 μm, 20 μm to 900 μm, 25 μm to 800 μm, 25 μm to 750 μm, 50 μm to 1,000 μm, 65 μm to 800 μm, 500 μm to 1,000 μm, or 600 μm to 800 μm.

Since the average particle size of the component of the printing layer separated from the base layer satisfies the above range, the component of the printing layer can be effectively separated with the effect of cost reduction. Specifically, if the average particle size of the component of the printing layer separated from the base layer is less than the above range, it is not easy to separate fine particles, resulting in an increase in the cost of replacing the filter. If the average particle size of the component of the printing layer separated from the base layer exceeds the above range, the quality of the regenerated polyester-based chips produced in the recycling process of containers may be deteriorated.

The total thickness of the film may be 10 μm to 200 μm. For example, the total thickness of the film may be 10 μm to 150 μm, 30 μm to 160 μm, 60 μm to 120 μm, 60 μm to 140 μm, 90 μm to 110 μm, 80 μm to 90 μm, 20 μm to 130 μm, 25 μm to 100 μm, 30 μm to 80 μm, 35 μm to 60 μm, or 35 μm to 45 μm.

The film may have a light transmittance of 90% or more at a wavelength of 550 nm. Specifically, the light transmittance of the film measured at a wavelength of 550 nm before and after immersion in an aqueous solution of sodium hydroxide (NaOH) having a concentration of 1% at 85° C. may be 90.5% or more, 91% or more, 92% or more, or 93% or more, respectively.

In addition, the change in light transmittance of the film before and after immersion in an aqueous solution of sodium hydroxide (NaOH) having a concentration of 1% at 85° C. may be 0.7% or less. For example, the change in light transmittance of the film before and after the immersion may be 0.6% or less or 0.5% or less.

The change in light transmittance refers to an absolute value of the difference between the light transmittance of the film measured at a wavelength of 550 nm before the immersion and the light transmittance of the film measured at a wavelength of 550 nm after the immersion.

In addition, the change (ΔL) in Col-L may be 0.7 or less, the change (Δa) in Col-a may be 0.5 or less, and the change (Δb) in Col-b may be 0.5 or less, before and after immersion of the film in an aqueous solution of sodium hydroxide (NaOH) having a concentration of 1% at 85° C. For example, the change (ΔL) in Col-L may be 0.65 or less, 0.6 or less, 0.55 or less, or 0.5 or less, the change (Δa) in Col-a may be 0.3 or less, 0.1 or less, 0.08 or less, 0.06 or less, or 0.05 or less, and the change (Δb) in Col-b may be 0.3 or less, 0.1 or less, 0.08 or less, or 0.07 or less, before and after the immersion.

The change (ΔL) in Col-L refers to an absolute value of the difference between the Col-L value before the immersion and the Col-L value after the immersion, the change (Δa) in Col-a refers to an absolute value of the difference between the Col-a value before the immersion and the Col-a value after the immersion, and the change (Δb) in Col-b refers to an absolute value of the difference between the Col-b value before the immersion and the Col-b value after the immersion.

Since the change (ΔL) in Col-L, the change (Δa) in Col-a, and the change (Δb) in Col-b, before and after the immersion of the film, satisfy the above ranges, the average particle size of the component of the printing layer separated from the base layer satisfies 15 μm or more while there is little change in the physical properties such as light transmittance and color change even before and after immersion, resulting in excellent quality. Specifically, it is possible to provide regenerated polyester-based chips having excellent quality in the regeneration process of a container provided with the film.

Col-L, Col-a, and Col-b are color coordinates established by the Commission International d'Eclairage (CIE), where color is represented by L (brightness), a (green to red complementary color), and b (yellow to blue complementary color). They can be measured using UltraScan PRO (manufacturer: Hunterlab), but it is not limited thereto.

In addition, the change in the haze of the film before and after immersion in an aqueous solution of sodium hydroxide (NaOH) having a concentration of 1% may be 0.5% or less. Specifically, the haze of the film refers to the haze of the base layer. Since the component of the printing layer is removed from the film after the immersion, it is possible to measure the haze, and the change in haze may be 0.4% or less, 0.35% or less, or 0.3% or less. The change in haze refers to an absolute value of the difference between the haze before the immersion and the haze after the immersion. If the component of the printing layer is not removed, the haze cannot be measured for the film comprising the printing layer.

Since the change in haze satisfies the above range, there is little change in the physical properties such as haze even before and after immersion. Thus, in the film according to an embodiment, the average particle size of the component of the printing layer separated from the base layer satisfies 15 μm or more while there is little change in the physical properties such as haze even before and after the immersion, resulting in excellent quality. Specifically, it is possible to provide regenerated polyester-based chips having excellent quality in the regeneration process of a container provided with the film.

In addition, the film may have a heat shrinkage rate of 1% to 55% in a first direction or in a second direction upon thermal treatment at a temperature of 70° C. for 10 seconds. For example, the film may have a heat shrinkage rate of 1% to 50%, 3% to 50%, 5% to 50%, 10% to 50%, 20% to 45%, or 25% to 40%, in a first direction or in a second direction upon thermal treatment at a temperature of 70° C. for 10 seconds.

The film may have a heat shrinkage rate of 30% or more in a first direction or in a second direction upon thermal treatment at a temperature of 80° C. for 10 seconds. For example, the film may have a heat shrinkage rate of 35% or more, 40% or more, 45% or more, 50% or more, 30% to 85%, 40% to 80%, or 50% to 80%, in a first direction or in a second direction upon thermal treatment at a temperature of 80° C. for 10 seconds.

In addition, the film may have a heat shrinkage rate of 50% or more in a first direction or in a second direction upon thermal treatment at a temperature of 90° C. for 10 seconds. For example, the film may have a heat shrinkage rate of 55% or more, 60% or more, 70% or more, 50% to 90%, 60% to 85%, 70% to 85%, or 70% to 80%, in a first direction or in a second direction upon thermal treatment at a temperature of 90° C. for 10 seconds.

The film may have a heat shrinkage rate of 30% or more in a first direction or in a second direction upon thermal treatment at a temperature of 100° C. for 10 seconds. For example, the film may have a heat shrinkage rate of 35% or more, 40% or more, 50% or more, 30% to 90%, 30% to 80%, 40% to 80%, 45% to 80%, or 50% to 80%, in a first direction or in a second direction upon thermal treatment at a temperature of 100° C. for 10 seconds.

Since the heat shrinkage rates at 70° C., 80° C., 90° C., and 100° C. satisfy the above ranges, it is convenient to conduct labeling in the process in which the film surrounds at least a portion of a container.

In addition, the film may have a glass transition temperature (Tg) of 60° C. or higher as measured by differential scanning calorimetry. For example, the film may have a glass transition temperature of 60° C. or higher, 65° C. or higher, 70° C. to less than 80° C., or 70° C. to 75° C., as measured by differential scanning calorimetry.

The film may have a melting point (Tm) of 170° C. or higher as measured by differential scanning calorimetry. For example, the film may have a melting point of 170° C. or higher, 175° C. or higher, specifically 170° C. to 230° C., 170° C. to 200° C., or 175° C. to 200° C., as measured by differential scanning calorimetry.

Since the glass transition temperature and the melting point of the film satisfy the above ranges, the clumping phenomenon that may occur in the regeneration process can be reduced. Specifically, the flakes may form aggregates during the thermal treatment in the process of regenerating a container. This clumping phenomenon may deteriorate the quality of the regenerated polyester-based chips thus produced, thereby impairing the recyclability of the containers.

However, since the glass transition temperature and the melting point of the film according to an embodiment satisfy the above ranges, it is possible to reduce the clumping phenomenon that may occur in the regeneration process. Thus, it is possible to enhance the recyclability of containers, thereby maximizing the quality and productivity of the regenerated polyester-based chips thus produced.

In addition, the crystallization temperature of the film is not measured or is 70° C. to 130° C., as measured by differential scanning calorimetry. For example, the crystallization temperature (Tc) of the film is not measured or may be 70° C. to 120° C., 75° C. to 110° C., or 80° C. to 110° C., as measured by differential scanning calorimetry.

The heat of crystallization of the film may be 0.01 J/g to 50 J/g as measured at the crystallization temperature (Tc). For example, the heat of crystallization of the film may be 0.01 J/g to 40 J/g, 0.05 J/g to 30 J/g, 0.1 J/g to 20 J/g, 0.1 J/g to 10 J/g, 0.1 J/g to 8 J/g, or 0.1 J/g to 5 J/g, as measured at the crystallization temperature (Tc).

Since the crystallization temperature and the heat of crystallization satisfy the above ranges, it is possible to reduce the clumping phenomenon that may occur in the regeneration process. Thus, it is possible to enhance the recyclability of containers, thereby maximizing the quality and productivity of the regenerated polyester-based chips thus produced.

Specifically, if the film has a melting point (Tm) of 170° C. or higher and a crystallization temperature (Tc) of 70° C. to 130° C. as measured by differential scanning calorimeter, the effect of reducing the clumping phenomenon can be maximized.

Process for Preparing a Polyester-Based Film

The process for preparing a polyester-based film according to an embodiment comprises forming a base layer from a composition for a base layer comprising a polyester-based resin; and forming a printing layer on one side of the base layer from a composition for a printing layer.

The process for preparing a polyester-based film according to another embodiment comprises forming a base layer from a composition for a base layer comprising a polyester-based resin; forming a stripping promoting layer on one side of the base layer from a composition for a stripping promoting layer; and forming a printing layer on one side of the base layer from a composition for a printing layer.

Base Layer

The base layer may be formed from a composition for a base layer comprising a polyester-based resin. Details on the polyester-based resin are as described above.

Specifically, the polyester-based resin may be melt-extruded at 260° C. to 300° C. or 270° C. to 290° C. through a T-die and then cooled to obtain an unstretched sheet. The unstretched sheet is passed through a chamber to be preheated while it is conveyed at a speed of 10 m/minute to 110 m/minute or 20 m/minute to 90 m/minute and then stretched to obtain a stretched sheet, which is heat-set to prepare a base layer.

The preheating may be carried out at 90° C. to 120° C. for 0.01 to 1 minute. For example, the preheating temperature (T1) may be 95° C. to 115° C. or 97° C. to 113° C., and the preheating time may be 0.05 minute to 0.5 minute or 0.08 minute to 0.2 minute.

In addition, the stretching may be uniaxial stretching or biaxial stretching. Specifically, the stretching may be uniaxial stretching carried out in a second direction, or biaxial stretching carried out in a first direction and then in a second direction perpendicular to the first direction. For example, if the stretching is uniaxial stretching, the second direction may be the transverse direction (TD).

Specifically, if the stretching is uniaxial stretching, the stretching may be carried out at a temperature lower than the preheating temperature (T1) by at least 20° C. in a second direction at a stretching ratio of 3 times to 5.5 times. For example, the stretching may be carried out at a stretching temperature of 60° C. to 90° C., 70° C. to 90° C., or 70° C. to 85° C. in a second direction at a stretching ratio of 2.5 times to 5.5 times, 2.5 times to 5 times, or 3.5 times to 5 times.

Alternatively, if the stretching is biaxial stretching, the stretching may be carried out at a temperature lower than the preheating temperature (T1) by at least 20° C. in a first direction at a stretching ratio of 2.5 times to 5 times and then in a second direction at a stretching ratio of 3 times to 5 times. For example, the stretching may be carried out at a stretching temperature of 60° C. to 90° C., 70° C. to 90° C., or 70° C. to 85° C. in a first direction at a stretching ratio of 2.5 times to 5 times, 2.5 times to 4 times, or 3.5 times to 5 times and then in a second direction at a stretching ratio of 2.5 times to 5 times, 2.5 times to 4 times, or 3.5 times to 5 times.

In addition, a coating step may be further carried out before the uniaxial stretching in the second direction or before stretching in the second direction after stretching in the first direction. Specifically, a coating step may be further carried out for forming a promoting layer or the like capable of imparting functionality such as antistatic or the like to the film. The coating step may be carried out by spin coating or in-line coating, but it is not limited thereto.

The heat setting may be annealing and carried out at 70° C. to 95° C. for 0.01 minute to 1 minute. For example, the heat setting temperature (T2) may be 75° C. to 95° C., 75° C. to 93° C., 80° C. to 93° C., or 85° C. to 93° C., and the heat setting time may be 0.05 minute to 0.5 minute or 0.08 minute to 0.2 minute.

The preheating temperature (T1)-heat setting temperature (T2) may be 10° C. to 40° C. Specifically, the stretching temperature may be lower than the preheating temperature (T1) by 10° C. or more, 15° C. or more, or 20° C. or more, and the heat setting temperature (T2) may be higher than the stretching temperature by 5° C. or more or 10° C. or more. Since the preheating temperature, stretching temperature, and heat setting temperature satisfy the above ranges, the heat shrinkage rates in the first direction and in the second direction can be effectively controlled.

Stripping Promoting Layer

The stripping promoting layer may be formed by coating a composition for a stripping promoting layer on one side of the base layer. Specifically, it may be formed by carrying out the in-line or off-line coating of a composition for a stripping promoting layer on one side of the base layer, but it is not limited thereto.

Details on the composition for a stripping promoting layer are as described above.

Printing Layer

The printing layer may be formed from a composition for a printing layer using a printer. Specifically, the base layer or the base layer having a stripping promoting layer formed on one side thereof is put into a printer to print the composition for a printing layer on one side of the stripping promoting layer, thereby forming a printing layer.

Details on the composition for a printing layer are as described above.

Process for Regenerating a Polyester-Based Container

The process for regenerating a polyester-based container according to another embodiment comprises providing a polyester-based container at least a portion of which is surrounded by the polyester-based film; crushing the polyester-based container provided with the film to obtain flakes; immersing the crushed flakes in an aqueous solution of sodium hydroxide (NaOH) having a concentration of 1% at 85° C., and thermally treating the immersed flakes to produce regenerated polyester-based chips, wherein when the flakes are thermally treated at a temperature of 200° C. to 220° C. for 60 minutes to 120 minutes, the clumping fraction is 5% or less.

In Order to Regenerate a Polyester-Based Container According to an Embodiment, a Polyester-Based Container at Least a Portion of which is Surrounded by the Polyester-Based Film is Prepared.

Conventionally adopted was a process, which comprises washing recycled waste products in which containers, metals, glass, and plastics may be intermingled to classify polyester-based containers and removing the films or like wrapping the containers in order to enhance the recyclability and quality of the containers. The removal step has been carried out by mechanically tearing or cutting the films or by such an additional step as liquid specific gravity separation, dehydration, drying, wind specific gravity separation, or pelletization.

However, it was difficult to completely remove the films in the above removal step. In particular, it was difficult to enhance the quality of the regenerated polyester-based chips thus produced due to the residual ink that had been formed on the films.

In the process for regenerating a polyester-based container according to an embodiment, it is possible to produce regenerated polyester-based chips without an additional step of removing the film surrounding the polyester-based container, whereby the cost is saved. In addition, in the film according to an embodiment, the component of the printing layer is readily separated, and all of them are not dissolved in an aqueous solution of sodium hydroxide in the washing step, resulting in an excellent effect of preventing environmental pollution.

In the polyester-based container, the polyester-based film is provided on the outer surface of the container. Specifically, the outer surface of the polyester-based container is covered with the polyester-based film, and the film may be shrunk by steam or hot air to surround at least a portion of the outer surface of the polyester-based container. For example, the polyester-based film, as a heat shrinkable film, may be a label of the polyester-based container, but it is not limited thereto.

Details on the polyester-based film are as described above.

The polyester-based container may comprise a polyester-based resin in an amount of at least 90% by weight based on the total weight of the polyester-based container. For example, the polyester-based container may be a container that comprises polyethylene terephthalate (PET) and may comprise polyethylene terephthalate in an amount of 90% by weight or more, 95% by weight or more, or 99% by weight or more, based on the total weight of the polyester-based container, but it is not limited thereto.

Thereafter, the Polyester-Based Container Provided with the Film is Crushed to Obtain Flakes.

Specifically, at least a portion of the outer surface of the polyester-based container is surrounded by the film, and the container and the film are crushed together to obtain flakes without a step of separating the container and the film.

That is, the flakes comprise first flakes obtained by crushing the polyester-based container and second flakes obtained by crushing the film.

The particle size of the first flakes may be 0.1 mm to 25 mm, and the particle size of the second flakes may be 0.1 mm to 25 mm. For example, the particle size of the first flakes may be 0.3 mm to 23 mm, 0.5 mm to 20 mm, 1 mm to 20 mm, 0.5 mm to 15 mm, 0.5 mm to 13 mm, 1 mm to 18 mm, 1 mm to 15 mm, 1 mm to 13 mm, or 2 mm to 10 mm, and the particle size of the second flakes may be 0.3 mm to 23 mm, 0.5 mm to 20 mm, 1 mm to 20 mm, 0.5 mm to 15 mm, 0.5 mm to 13 mm, 1 mm to 18 mm, 1 mm to 15 mm, 1 mm to 13 mm, or 2 mm to 10 mm, but they are not limited thereto.

Thereafter, the Crushed Flakes are Immersed in an Aqueous Solution of Sodium Hydroxide (NaOH) Having a Concentration of 1% at 85° C.

Specifically, the crushed flakes are immersed in an aqueous solution of sodium hydroxide having a concentration of 1% at 85° C. for 5 minutes to 30 minutes to be washed. For example, the first flakes and second flakes may be immersed in an aqueous solution of sodium hydroxide having a concentration of 1% at 85° C. for 5 minutes to 25 minutes or 10 minutes to 20 minutes to be washed.

As the washing step is carried out, it is possible to remove impurities that may remain in the crushed flakes, as well as to effectively remove the component of the printing layer. Thus, it is possible to enhance the quality and purity of the regenerated polyester-based chips thus produced, thereby maximizing the recyclability of containers.

As described above, when the film is cut into a size of 1 cm in width and 1 cm in length, immersed in an aqueous solution of sodium hydroxide having a concentration of 1%, and stirred for 15 minutes at 85° C. at a speed of 240 m/minute, the average particle size of the component of the printing layer separated from the base layer is 15 μm or more.

Thus, it is possible to effectively separate and remove the component of the printing layer remaining in the crushed flakes, particularly the second flakes, from the second flakes through the washing step. In addition, since the component of the printing layer has an average particle size of 15 μm or more while it is not dissolved in an aqueous solution of sodium hydroxide, it is possible to effectively remove the component, particularly the ink component, of the printing layer, thereby enhancing the quality and purity of the regenerated polyester-based chips thus produced with an excellent effect of environmental protection.

Specifically, the component of the printing layer having an average particle size of 15 μm or more can be separated and removed from the aqueous solution of sodium hydroxide by using a filter having a pore size of 15 μm or a filter of 0.1 mm to less than 25 mm, which is smaller than the size of the flakes, but it is not limited thereto.

In addition, if the washing step in which the film is immersed in an aqueous solution of sodium hydroxide having a concentration of 1% at 85° C. for 5 minutes to 30 minutes is a first washing step, a second washing step may be further carried out after the first washing step.

Specifically, the second washing step may be carried out with water at room temperature and/or an aqueous solution of sodium hydroxide having a concentration of 0.5% to 3% at 80° C. to 97° C. for 5 minutes to 30 minutes.

More specifically, if the second washing step is carried out with an aqueous solution of sodium hydroxide having a concentration of 0.5% to 3%, it is possible to more effectively remove impurities remaining in the crushed flakes. If the second washing step is carried out with water at room temperature, it is possible to remove the residual aqueous solution of sodium hydroxide. For example, a second washing step may be carried out with water at room temperature after the first washing step. Alternatively, washing with an aqueous solution of sodium hydroxide having a concentration of 0.5% to 3% is carried out after the first washing step, followed by a second washing step with water at room temperature.

In addition, after the washing step, a step of drying the washed flakes at 60° C. to 175° C. for 10 minutes to 30 minutes may be further carried out. For example, the drying step may be carried out at 65° C. to 175° C., 70° C. to 170° C., 90° C. to 165° C., 100° C. to 165° C., or 120° C. to 165° C. for 15 minutes to 85 minutes, 20 minutes to 70 minutes, 15 minutes to 30 minutes, or 50 minutes to 70 minutes.

The washing and drying steps may be carried out once to five times repeatedly. For example, impurities remaining in the flakes can be effectively removed by repeatedly carrying out the washing and drying steps two to five times or three to five times in order.

Finally, the Immersed Flakes are Thermally Treated to Produce Regenerated Polyester-Based Chips.

The thermal treatment may be carried out at 200° C. to 220° C. for 60 minutes to 120 minutes. For example, the thermal treatment may be carried out at 200° C. to 215° C. or 205° C. to 220° C. for 70 minutes to 120 minutes or 80 minutes to 120 minutes.

In addition, when the flakes are thermally treated at a temperature of 200° C. to 220° C. for 60 minutes to 120 minutes, the clumping fraction may be 5% or less. For example, when the flakes are thermally treated at 220° C. for 60 minutes or at 210° C. for 90 minutes, the clumping fraction may be 4% or less, 3% or less, 2.5% or less, 2% or less, 1% or less, or 0.8% or less.

Clumping refers to an aggregate that may be formed from the flakes. The size of the aggregate may be, for example, at least three times the size of the flake particles. The clumping fraction refers to the fraction of the aggregates based on the total weight of the flakes. For example, the flakes may be passed through a sieve and thermally treated. At that time, aggregates may be formed as the flakes are clumped. The aggregates may be passed through a sieve again to be separated. The weight of the aggregates thus collected is measured to calculate the weight ratio of the aggregates based on the total weight of the thermally treated flakes as the clumping fraction.

Thus, the higher the value of the crumbling fraction is, the more the first flakes and the second flakes are entangled together to lower the quality of the regenerated polyester-based chips. However, the second flakes are obtained by crushing the polyester-based film according to an embodiment, thereby effectively reducing or preventing the formation of aggregates and enhancing the quality of the regenerated polyester-based chips thus produced.

Regenerated polyester-based chips may be obtained after the thermal treatment step. Specifically, the regenerated polyester-based chips that comprise the first flakes and the second flakes may be obtained after the thermal treatment step. For example, the flakes may be melt-extruded and cut to obtain regenerated polyester-based chips, but it is not limited thereto.

Regenerated Polyester-Based Chips

The regenerated polyester-based chips according to still another embodiment are produced by the process for regenerating a polyester-based container.

Specifically, the regenerated polyester-based chips may comprise first flakes comprising polyethylene terephthalate and second flakes comprising a polyester-based resin.

The regenerated polyester-based chips may have an intrinsic viscosity (IV) of 0.60 dl/g or more. For example, the regenerated polyester-based chips may have an intrinsic viscosity (IV) of 0.63 dl/g or more, 0.65 dl/g or more, 0.70 dl/g or more, 0.75 dl/g or more, 0.60 dl/g to 3.00 dl/g, 0.60 dl/g to 2.0 dl/g, or 0.65 dl/g to 1.0 dl/g.

In addition, the regenerated polyester-based chips may comprise polyethylene terephthalate in an amount of 70% by weight to 99% by weight and a polyester-based resin in an amount of 1% by weight to 30% by weight, based on the total weight of regenerated polyester-based chips. For example, the regenerated polyester-based chips may comprise polyethylene terephthalate in an amount of 80% by weight to 99% by weight, 90% by weight to 99% by weight, or 95% by weight to 99% by weight and a polyester-based resin in an amount of 1% by weight to 20% by weight, 1% by weight to 10% by weight, or 1% by weight to 5% by weight, based on the total weight of the regenerated polyester-based chips.

Mode for the Invention

Hereinafter, the present invention will be described in more detail with reference to the following examples. However, these examples are set forth to illustrate the present invention, and the scope of the present invention is not limited thereto.

Example A

Preparation of a Polyester-Based Film

Preparation Example 1-1

A stainless steel autoclave equipped with a stirrer, a thermometer, and a partial reflux condenser was charged with 100% by mole of terephthalic acid (TPA) as a dicarboxylic acid component and 78% by mole of ethylene glycol (EG), 17% by mole of neopentyl glycol (NPG), and 5% by mole of diethylene glycol (DEG) as a diol component. Then, 0.05% by mole (based on the acid component) of zinc acetate as a transesterification catalyst was added thereto. The transesterification reaction was carried out while methanol was being distilled off. Thereafter, 0.025% by mole (based on the acid component) of antimony trioxide as a polycondensation catalyst was added, and the polycondensation reaction was carried out under a reduced pressure of 26.6 Pa (0.2 Torr) at 280° C. to obtain a polyester-based resin.

Preparation Examples 1-2 to 1-6

Polyester-based resins were prepared in the same manner as in Preparation Example 1-1, except that the components and contents were changed as shown in Table 1 below.

TABLE 1

|  | Prep. Ex. 1-1 | Prep. Ex. 1-2 | Prep. Ex. 1-3 | Prep. Ex. 1-4 | Prep. Ex. 1-5 | Prep. Ex. 1-6 |
| --- | --- | --- | --- | --- | --- | --- |
| TPA (% by mole) | 100 | 100 | 100 | 100 | 100 | 100 |
| EG (% by mole) | 78 | 70 | 63 | 38 | 68.5 | 68 |
| NPG (% by mole) | 17 | 24 | 30 | 57 | — | — |
| CHDM (% by mole) | — | — | — | — | 30 | 22 |
| DEG (% by mole) | 5 | 6 | 7 | 5 | 1.5 | 10 |

* CHDM: cyclohexanedimethanol

Preparation of a Composition for a Printing Layer

Preparation Example 2-1

25% by weight of ethanol, 35% by weight of a polyester-based binder (BNPE-100, manufacturer: BN Chemical), and 40% by weight of a Blue pigment (First Blue 1530, manufacturer: First Color) were mixed and stirred to prepare a composition for a printing layer.

Preparation Examples 2-2 to 2-6

Compositions for a printing layer were prepared in the same manner as in Preparation Example 2-1, except that the components and contents were changed as shown in Table 2 below.

TABLE 2

|  |  | Prep. Ex. 2-1 | Prep. Ex. 2-2 | Prep. Ex. 2-3 | Prep. Ex. 2-4 | Prep. Ex. 2-5 | Prep. Ex. 2-6 |
| --- | --- | --- | --- | --- | --- | --- | --- |
| Alcohol | | Ethanol 25% by weight | Ethanol 30% by weight | Ethanol 20% by weight | Toluene 30% by weight | Ethanol 45% by weight | Ethanol 40% by weight |

TABLE 2-continued

|  | Prep. Ex. 2-1 | Prep. Ex. 2-2 | Prep. Ex. 2-3 | Prep. Ex. 2-4 | Prep. Ex. 2-5 | Prep. Ex. 2-6 |
| --- | --- | --- | --- | --- | --- | --- |
| Binder | Polyester-based 35% by weight | Acrylic-based 30% by weight | Polyurethane-based 40% by weight | Polypropylene-based 30% by weight | Polyester-based 15% by weight | Acrylic-based 20% by weight |
| Pigment | Blue 40% by weight | Green 40% by weight | Yellow 40% by weight | Blue 40% by weight | Green 40% by weight | Yellow 40% by weight |

* Acrylic-based binder (509, manufacturer: Daeyang Chemical)
* Polyurethane-based binder (GR-103F, manufacturer: Base Korea)
* Polypropylene-based binder (BINDER-I, manufacturer: Hyundai Chemical)
* Green pigment (F3G, manufacturer: Dongyang Chemical)
* Yellow pigment (FR, manufacturer: Dongyang Chemical)

Preparation of a Polyester-Based Film

Preparation Example 3-1

The polyester-based resin of Preparation Example 1-1 was fed to an extruder and then melt-extruded at 280° C. through a T-die, which was cooled to obtain an unstretched sheet. Then, the unstretched sheet was preheated at 105° C. for 0.1 minute while it was transferred at a speed of 30 m/minute. Thereafter, it was stretched in the transverse direction at 85° C. at a stretching ratio of 4.0 times to 4.7 times. Thereafter, it was heat set at 90° C. for 0.1 minute to prepare a base layer having a thickness of 40 μm.

Thereafter, the base layer was put into a printer, and one side of the base layer was printed with the composition for a printing layer of Preparation Example 2-1 to prepare a polyester-based film having a total thickness of 42 μm in which a printing layer having a thickness of 2 μm was formed.

Preparation Examples 3-2 to 3-6

Polyester-based films were prepared in the same manner as in Preparation Example 3-1, except that the polyester-based resins of Preparation Examples 1-2 to 1-6 were each used instead of the polyester-based resin of Preparation Example 1-1, and the compositions for a printing layer of Preparation Examples 2-2 to 2-6 were each used instead of the composition for a printing layer of Preparation Example 2-1, as shown in Table 3 below.

Preparation of Regenerated Polyester-Based Chips

Example 1

A part of the outer surface of a polyethylene terephthalate container (PET container, 30 g) was wrapped with the polyester-based film (1 g) of Preparation Example 3-1. The film was shrunk in hot air at a temperature of 90° C. to prepare a polyester-based container in which the film surrounded a part of the outer surface.

Thereafter, the container provided with the film was crushed with a crusher to obtain flakes. The crushed flakes were immersed in an aqueous solution of sodium hydroxide (NaOH) having a concentration of 1% at 85° C. and washed for 15 minutes at a stirring speed of 240 m/minute.

Thereafter, the flakes were washed once more with water at room temperature to remove the residual aqueous solution of sodium hydroxide and then filtered through a sieve having a pore size of 15 μm. Thereafter, they were dried at 160° C. for 1 hour and then thermally treated at 210° C. for 90 minutes to produce regenerated polyester-based chips.

Examples 2 and 3 and Comparative Examples 1 to 3

Regenerated polyester-based chips were prepared in the same manner as in Example 1, except that the polyester-based films of Preparation Examples 3-2 to 3-6 were each used instead of the polyester-based film of Preparation Example 3-1.

EVALUATION EXAMPLE

Evaluation Example 1-1: Average Particle Size

A stirrer was charged with an aqueous solution of sodium hydroxide (NaOH) having a concentration of 1%, which was heated to 85° C. The film was cut into 1 cm in width and 1 cm in length and added thereto. After it was stirred for 15 minutes at a stirring speed of 240 m/minute, the average particle size of the component of the printing layer thus separated was measured using MICROTRAC S-3500 (manufacturer: Dream Corporation).

Evaluation Example 1-2: Light Transmittance and Color

The film was cut into 1 cm in width and 1 cm in length and immersed in an aqueous solution of sodium hydroxide having a concentration of 1% at 85° C. It was measured for the light transmittance at 550 nm, Col-L, Col-a, and Col-b before and after the immersion using UltraScan PRO (manufacturer: Hunterlab).

Evaluation Example 1-3: Clumping Fraction

The flakes prepared above were passed through a 0.625"-sieve. 1 kg of the flakes thus sieved was exposed in an oven at 210° C. for 90 minutes. The flakes were cooled to room temperature and passed through a 0.625"-sieve. The weight of the aggregates thus filtered out was measured and calculated as a percentage of the total weight of the flakes.

TABLE 3

|  |  | Ex. 1 | Ex. 2 | Ex. 3 | C. Ex. 1 | C. Ex. 2 | C. Ex. 3 |
|---|---|---|---|---|---|---|---|
| Film | Base layer | Prep. Ex. 1-1 | Prep. Ex. 1-2 | Prep. Ex. 1-3 | Prep. Ex. 1-4 | Prep. Ex. 1-5 | Prep. Ex. 1-6 |
|  | Printing layer | Prep. Ex. 2-1 | Prep. Ex. 2-2 | Prep. Ex. 2-3 | Prep. Ex. 2-4 | Prep. Ex. 2-5 | Prep. Ex. 2-6 |
| Before immersion | Light transmittance | 94.5 | 95.0 | 92.0 | 93.0 | 94.0 | 94.0 |
|  | Col-L | 91.5 | 92.2 | 92.3 | 95.8 | 96.0 | 94.0 |
|  | Col-a | −1.37 | −1.32 | −1.33 | 0.02 | 0.06 | 0.03 |
|  | Col-b | 1.97 | 1.90 | 1.85 | 0.60 | 0.48 | 0.40 |
| After immersion | Light transmittance | 94.4 | 94.5 | 91.8 | 93.0 | 85.0 | 93.9 |
|  | Col-L | 91.0 | 92.0 | 92.0 | 95.8 | 87.0 | 93.9 |
|  | Col-a | −1.32 | −1.34 | −1.35 | 0.02 | −1.10 | 0.03 |
|  | Col-b | 1.90 | 1.89 | 1.86 | 0.60 | −0.10 | 0.39 |
| Average particle size of the printing layer component (μm) | | 70 | 25 | 75 | # | 5 | 14 |
| Clumping fraction (%) | | 0.7 | 1 | 1.8 | 5.4 | 23 | 22.5 |

: Since the component of the printing layer was completely dissolved in the aqueous solution of sodium hydroxide, the particle size thereof could not be measured.

As shown in Table 3 above, the regenerated polyester-based chips of Examples 1 to 3 prepared by the polyester-based films of Preparation Examples 3-1 to 3-3 and the process for regenerating a polyester-based container using the same had excellent quality as compared with Comparative Examples 1 to 3.

Specifically, as the polyester-based films of Preparation Examples 3-1 to 3-3 comprised the printing layers of Preparation Examples 2-1 to 2-3, there was almost no change in the light transmittance and color before and after immersion in an aqueous solution of sodium hydroxide having a concentration of 1% at a temperature of 85° C., and the average particle size of the component of the printing layer separated in the regeneration process was 15 μm or more. As a result, the regenerated polyester-based chips produced according to the process for regenerating a polyester-based container comprising the same were excellent in quality. In addition, since the component of the printing layer was not dissolved in the aqueous solution of sodium hydroxide, the effect of preventing environmental pollution was excellent as well.

In contrast, the regenerated polyester-based chips of Comparative Examples 1 to 3 had a high clumping fraction, resulting in poor quality and low recyclability. Since the component of the printing layer was completely dissolved in the aqueous solution of sodium hydroxide or the average particle size thereof was less than 15 μm, it was not readily separated, resulting in a problem of environmental pollution.

Example B

Preparation of a Polyester-Based Film

Preparation Example 4-1

A stainless steel autoclave equipped with a stirrer, a thermometer, and a partial reflux condenser was charged with 100% by mole of terephthalic acid (TPA) as a dicarboxylic acid component and 65% by mole of ethylene glycol (EG), 30% by mole of neopentyl glycol (NPG), and 5% by mole of diethylene glycol (DEG) as a diol component. 0.05% by mole (based on the acid component) of zinc acetate as a transesterification catalyst was added thereto. The transesterification reaction was carried out while methanol was being distilled off. Thereafter, 0.025% by mole (based on the acid component) of antimony trioxide as a polycondensation catalyst was added, and the polycondensation reaction was carried out under a reduced pressure of 26.6 Pa (0.2 Torr) at 280° C. to obtain a polyester-based resin.

Preparation Examples 4-2 to 4-6

Polyester-based resins were prepared in the same manner as in Preparation Example 4-1, except that the components and contents were changed as shown in Table 4 below.

TABLE 4

|  | Prep. Ex. 4-1 | Prep. Ex. 4-2 | Prep. Ex. 4-3 | Prep. Ex. 4-4 | Prep. Ex. 4-5 | Prep. Ex. 4-6 |
|---|---|---|---|---|---|---|
| TPA (% by mole) | 100 | 100 | 100 | 100 | 100 | 100 |
| EG (% by mole) | 65 | 71 | 73 | 75 | 78 | 68.5 |
| NPG (% by mole) | 30 | 24 | 22 | 20 | 17 | — |
| CHDM (% by mole) | — | — | — | — | — | 30 |
| DEG (% by mole) | 5 | 5 | 5 | 5 | 5 | 1.5 |

Preparation of a Composition for a Stripping Promoting Layer

Preparation Example 5-1

25% by weight of ethanol, 35% by weight of a polyester-based binder (BNPE-100, manufacturer: BN Chemical), and 40% by weight of a Blue pigment (FR, manufacturer: Dongyang Chemical) were mixed and stirred to prepare a composition for a stripping promoting layer.

Preparation Examples 5-2 to 5-6

Compositions for a stripping promoting layer were prepared in the same manner as in Preparation Example 5-1, except that the components and contents were changed as shown in Table 5 below.

TABLE 5

|  | Second solvent | Second binder | Second pigment |
|---|---|---|---|
| Prep. Ex. 5-1 | 25% by weight of ethanol | 35% by weight of polyester-based | 40% by weight of Blue |
| Prep. Ex. 5-2 | 30% by weight of ethanol | 30% by weight of acrylic-based | 40% by weight of Blue |
| Prep. Ex. 5-3 | 20% by weight of ethanol | 40% by weight of polyurethane-based | 40% by weight of Yellow |
| Prep. Ex. 5-4 | 35% by weight of ethanol | 25% by weight of acrylic urethane-based | 40% by weight of Yellow |

\* Acrylic-based (509, manufacturer: Daeyang Chemical)
\* Polyurethane-based (GR-103F, manufacturer: Base Korea)
\* Acrylic urethane-based (Binder PT-104, manufacturer: Hyundai Chemical)

Preparation of a Composition for a Printing Layer

Preparation Example 6-1

30% by weight of toluene, 30% by weight of a polypropylene-based binder (BINDER-I, manufacturer: Hyundai Chemical), and 40% by weight of a Blue pigment (First Blue 1530, manufacturer: First Color) were mixed and stirred to prepare a composition for a printing layer.

Preparation Example 6-2

Compositions for a printing layer were prepared in the same manner as in Preparation Example 6-1, except that a Yellow pigment was used instead of a Blue pigment.

TABLE 6

|  | First solvent | First binder | First pigment |
|---|---|---|---|
| Prep. Ex. 6-1 | 30% by weight of toluene | 30% by weight of propylene-based | 40% by weight of Blue |
| Prep. Ex. 6-2 | 30% by weight of toluene | 30% by weight of propylene-based | 40% by weight of Yellow |

\* Yellow pigment (FR, manufacturer: Dongyang Chemical)

Preparation of a Polyester-Based Film

Preparation Example 7-1

The polyester-based resin of Preparation Example 4-1 was fed to an extruder and then melt-extruded at 280° C. through a T-die, which was cooled to obtain an unstretched sheet. Then, the unstretched sheet was preheated at 105° C. for 0.1 minute while it was transferred at a speed of 30 m/minute. Thereafter, it was stretched in the transverse direction at 85° C. at a stretching ratio of 4.0 times to 4.7 times and heat set at 90° C. for 0.1 minute to prepare a base layer having a thickness of 40 μm.

Thereafter, the composition for a stripping promoting layer of Preparation Example 5-1 was coated on one side of the base layer by the in-line or off-line coating to form a stripping promoting layer having a thickness of 100 nm. Thereafter, the base layer provided with a stripping promoting layer on one side thereof was put into a printer, and one side of the stripping promoting layer was printed with the composition for a printing layer of Preparation Example 6-1 to prepare a polyester-based film having a total thickness of 42.1 μm in which a printing layer having a thickness of 2 μm was formed.

Preparation Examples 7-2 to 7-6

Polyester-based films were prepared in the same manner as in Preparation Example 7-1, except that the polyester-based resins of Preparation Examples 4-2 to 4-6 were each used instead of the polyester-based resin of Preparation Example 4-1, the compositions for a stripping promoting layer of Preparation Examples 5-2 to 5-4 were each used instead of the composition for a stripping promoting layer of Preparation Example 5-1, and the composition for a printing layer of Preparation Example 6-1 or 6-2 was used, as shown in Table 7 below. Here, in the polyester-based films of Preparation Examples 7-5 and 7-6, a stripping promoting layer was not formed.

Preparation of Regenerated Polyester-Based Chips

Example 4

A part of the outer surface of a polyethylene terephthalate container (PET container, 30 g) was wrapped with the polyester-based film (1 g) of Preparation Example 7-1. The film was shrunk in hot air at a temperature of 90° C. to prepare a polyester-based container in which the film surrounded a part of the outer surface.

Thereafter, the container provided with the film was crushed with a crusher to obtain flakes. The crushed flakes were immersed in an aqueous solution of sodium hydroxide (NaOH) having a concentration of 1% at 85° C. and washed for 15 minutes at a stirring speed of 240 m/minute.

Thereafter, the flakes were washed once more with water at room temperature to remove the residual aqueous solution of sodium hydroxide and then filtered through a sieve having a pore size of 15 μm. Thereafter, they were dried at 160° C. for 1 hour and then thermally treated at 210° C. for 90 minutes to produce regenerated polyester-based chips.

Examples 5 and 6 and Comparative Examples 4 to 6

Regenerated polyester-based chips were prepared in the same manner as in Example 4, except that the polyester-based films of Preparation Examples 7-2 to 7-6 were each used instead of the polyester-based film of Preparation Example 7-1.

EVALUATION EXAMPLE

Evaluation Example 2-1: Average Particle Size

A stirrer was charged with an aqueous solution of sodium hydroxide (NaOH) having a concentration of 1%, which was heated to 85° C. The film was cut into 1 cm in width and 1 cm in length and added thereto. After it was stirred for 15 minutes at a stirring speed of 240 m/minute, the average particle size of the component of the printing layer thus separated was measured using MICROTRAC S-3500 (manufacturer: Dream Corporation).

Evaluation Example 2-2: Haze

The film was cut into 1 cm in width and 1 cm in length and immersed in an aqueous solution of sodium hydroxide having a concentration of 1% at 85° C. It was measured for the haze before and after the immersion using a haze meter NDH-5000W manufactured by Nippon Denshoku Industries Co., Ltd.

Evaluation Example 2-3: Clumping Fraction

The flakes prepared above were passed through a 0.625"-sieve. 1 kg of the flakes thus sieved was exposed in an oven at 210° C. for 90 minutes. The flakes were cooled to room temperature and passed through a 0.625"-sieve. The weight of the aggregates thus filtered out was measured and calculated as a percentage of the total weight of the flakes.

TABLE 7

| Film | | Ex. 4 | Ex. 5 | Ex. 6 | C. Ex. 4 | C. Ex. 5 | C. Ex. 6 |
|---|---|---|---|---|---|---|---|
| Film | Base layer | Prep. Ex. 4-1 | Prep. Ex. 4-2 | Prep. Ex. 4-3 | Prep. Ex. 4-4 | Prep. Ex. 4-5 | Prep. Ex. 4-6 |
| | Stripping promoting layer | Prep. Ex. 5-2 | Prep. Ex. 5-3 | Prep. Ex. 5-4 | — | — | Prep. Ex. 5-1 |
| | Printing layer | Prep. Ex. 6-1 | Prep. Ex. 6-1 | Prep. Ex. 6-1 | Prep. Ex. 6-2 | Prep. Ex. 6-2 | Prep. Ex. 6-1 |
| Average particle size of the printing layer component (μm) | | 25 | 750 | 18 | # | # | 74 |
| Haze % | Before immersion | 4.8 | 6.2 | 5.6 | 4.5 | 4.5 | 3.9 |
| | After immersion | 4.8 | 6.4 | 5.3 | — | — | 4.1 |
| Clumping fraction (%) | | 4.9 | 3.4 | 2.9 | 1.5 | 0.9 | 26 |

: Since the component of the printing layer was completely dissolved in the aqueous solution of sodium hydroxide, the particle size thereof could not be measured.

As shown in Table 7 above, the regenerated polyester-based chips of Examples 4 to 6 prepared by the polyester-based films of Preparation Examples 4-1 to 4-3 and the process for regenerating a polyester-based container using the same had excellent quality as compared with Comparative Examples 4 to 6.

Specifically, as the polyester-based films of Preparation Examples 7-1 to 7-3 comprised the stripping promoting layer, there was almost no change in the haze before and after immersion in an aqueous solution of sodium hydroxide having a concentration of 1% at a temperature of 85° C., and the average particle size of the component of the printing layer separated in the regeneration process was 15 μm or more. As a result, the regenerated polyester-based chips produced according to the process for regenerating a polyester-based container comprising the same were excellent in quality. In addition, since the component of the printing layer was not dissolved in the aqueous solution of sodium hydroxide, the effect of preventing environmental pollution was excellent as well.

In contrast, since the component of the printing layer was completely dissolved in the aqueous solution of sodium hydroxide in the regenerated polyester-based chips of Comparative Examples 4 to 6, there was a problem of environmental pollution. Specifically, the haze of the regenerated polyester-based chips of Comparative Examples 4 to 6 was not measured, indicating that the component of the printing layer was not removed, although they had a relatively low clumping fraction. Although the average particle size of the component of the printing layer thus separated was 15 μm or more, the regenerated polyester-based chips of Comparative Examples 6 had a very high clumping fraction, resulting in poor quality and low recyclability.

The invention claimed is:

1. A polyester-based film, which comprises a base layer comprising a polyester-based resin; and a printing layer disposed on one side of the base layer,
   wherein when the film is cut into a size of 1 cm in width and 1 cm in length, immersed in an aqueous solution of sodium hydroxide (NaOH) having a concentration of 1%, and stirred for 15 minutes at 85° C. at a speed of 240 m/minute, the average particle size of the component of the printing layer separated from the base layer is 15 μm or more,
   when the flakes obtained by crushing a polyethylene terephthalate (PET) container provided with the polyester-based film are thermally treated at a temperature of 200° C. to 220° C. for 60 minutes to 120 minutes, the clumping ratio is 5% or less.

2. The polyester-based film of claim 1, wherein the printing layer is formed from a composition for a printing layer that comprises a first solvent, a first binder, and a first pigment, and the weight ratio of the first solvent and the first binder is 1:0.5 to 2.5.

3. The polyester-based film of claim 2, wherein the first solvent comprises one or more selected from the group consisting of methanol, ethanol, propanol, isopropyl alcohol, butyl alcohol, 2-methyl-2-propanol, octanol, allyl alcohol, benzyl alcohol, ethylene glycol, diethylene glycol, triethylene glycol, tetramethylene glycol, tetraethylene glycol, propylene glycol, dipropylene glycol, tripropylene glycol, hexylene glycol, and neopentyl glycol.

4. The polyester-based film of claim 2, wherein the composition for a printing layer comprises the first solvent in an amount of 1% by weight to 35% by weight, the first binder in an amount of 25% by weight to 60% by weight, and the first pigment in an amount of 5% by weight to 50% by weight, based on the total weight of the composition for a printing layer.

5. The polyester-based film of claim/6, wherein the polyester-based resin comprises a diol component and a dicarboxylic acid component,
   the diol component comprises at least one selected from the group consisting of ethylene glycol, diethylene glycol, and neopentyl glycol, and the polyester-based resin comprises neopentyl glycol in an amount of 1% by mole to 35% by mole based on the total number of moles of the diol component.

6. The polyester-based film of claim 5, wherein the polyester-based resin comprises ethylene glycol in an amount of 55% by mole to 90% by mole and diethylene glycol in an amount of 1% by mole to 15% by mole, based on the total number of moles of the diol component, and the molar ratio of ethylene glycol and diethylene glycol is 7.8 to 26:1.

7. The polyester-based film of claim 1, wherein the thickness of the base layer is 10 μm to 100 μm, and the thickness of the printing layer is 0.1 μm to 100 μm.

8. The polyester-based film of claim 1, which has a light transmittance of 90% or more at a wavelength of 550 nm,
a change in light transmittance of 0.7% or less before and after the immersion, and
a change ($\Delta L$) in Col-L of 0.7 or less, a change ($\Delta a$) in Col-a of 0.5 or less, and a change ($\Delta b$) in Col-b of 0.5 or less, before and after the immersion.

9. A process for regenerating a polyester-based container, which comprises:
providing a polyester-based container at least a portion of which is surrounded by the polyester-based film according to claim 1;
crushing the polyester-based container provided with the film to obtain flakes;
immersing the crushed flakes in an aqueous solution of sodium hydroxide (NaOH) having a concentration of 1% at 85° C.; and
thermally treating the immersed flakes to produce regenerated polyester-based chips,
wherein when the flakes are thermally treated at a temperature of 200° C. to 220° C. for 60 minutes to 120 minutes, the clumping fraction is 5% or less.

10. Regenerated polyester chips prepared according to the regeneration process of claim 9.

* * * * *